United States Patent
Yamaguchi

(10) Patent No.: US 7,322,449 B2
(45) Date of Patent: Jan. 29, 2008

(54) HYDRAULIC SHOCK ABSORBER

(75) Inventor: Hiroyuki Yamaguchi, Machida (JP)

(73) Assignee: Hitachi, Ltd., Tokyo (JP)

( * ) Notice: Subject to any disclaimer, the term of this patent is extended or adjusted under 35 U.S.C. 154(b) by 65 days.

(21) Appl. No.: 11/142,334

(22) Filed: Jun. 2, 2005

(65) Prior Publication Data

US 2005/0279597 A1    Dec. 22, 2005

(30) Foreign Application Priority Data

Jun. 7, 2004 (JP) .............................. 2004-168508

(51) Int. Cl.
*F16F 9/34* (2006.01)
*F16F 9/50* (2006.01)

(52) U.S. Cl. .............. 188/282.3; 188/282.6; 188/313; 188/317; 188/322.15

(58) Field of Classification Search ................ 188/280, 188/282.5, 282.6, 282.8, 283, 313, 316, 317, 188/319.1, 322.13, 322.14, 322.15, 322.22
See application file for complete search history.

(56) References Cited

U.S. PATENT DOCUMENTS

| | | | |
|---|---|---|---|
| 4,953,671 A * | 9/1990 | Imaizumi .................. | 188/282.3 |
| 5,018,608 A * | 5/1991 | Imaizumi ................ | 188/322.15 |
| 5,293,971 A * | 3/1994 | Kanari et al. ............ | 188/282.1 |
| 5,404,973 A * | 4/1995 | Katoh et al. .............. | 188/282.1 |
| 6,474,454 B2 * | 11/2002 | Matsumoto et al. ...... | 188/282.6 |
| 7,070,029 B2 * | 7/2006 | Deferme ................. | 188/322.15 |
| 2005/0263363 A1* | 12/2005 | Katou et al. ........... | 188/322.22 |
| 2005/0279597 A1* | 12/2005 | Yamaguchi ............ | 188/322.13 |

FOREIGN PATENT DOCUMENTS

| JP | 3-113139 | 5/1991 |
|---|---|---|
| JP | 2004-257507 | 9/2004 |

* cited by examiner

*Primary Examiner*—Devon Kramer
(74) *Attorney, Agent, or Firm*—Wenderoth, Lind & Ponack, L.L.P.

(57) ABSTRACT

A piston connected to a piston rod is fitted into a cylinder in which a hydraulic fluid is sealably contained. A flow of the hydraulic fluid is generated in an extension-side fluid passage and a compression-side fluid passage according to a sliding motion of the piston, and this flow of the hydraulic fluid is controlled by a main disk valve, to thereby generate a damping force. A valve-opening pressure of the main disk valve is controlled by an internal pressure of a back-pressure chamber generated due to a difference in flow path area between a back-pressure chamber inlet fluid passage and a downstream-side orifice. During a reverse stroke, a check valve is opened, to thereby introduce a pressure in a downstream-side cylinder chamber into the back-pressure chamber, so that the main disk valve can be maintained in a closed position and a stable damping force can be generated.

13 Claims, 4 Drawing Sheets

HYDRAULIC SHOCK ABSORBER

BACKGROUND OF THE INVENTION

The present invention relates to a hydraulic shock absorber which is suitably mounted on a suspension apparatus for a vehicle, such as an automobile.

Generally, a cylinder-type hydraulic shock absorber mounted on a suspension apparatus for a vehicle, such as an automobile, comprises: a cylinder in which a hydraulic fluid is sealably contained; a piston portion which is slidably fitted into the cylinder and connected to a piston rod; and a damping force generating mechanism provided in the piston portion. The damping force generating mechanism includes a hydraulic fluid passage, an orifice, a disk valve, etc. In the damping force generating mechanism, a flow of hydraulic fluid in the hydraulic fluid passage, which is generated due to a sliding motion of the piston in the cylinder according to a stroke of the piston rod, is controlled by means of the orifice and the disk valve, to thereby generate a damping force. In a low-speed region of the piston speed, a damping force is generated by means of the orifice. In a high-speed region of the piston speed, the disk valve opens by being deflected, to thereby prevent an excessive increase in damping force.

In the above-mentioned related art of a hydraulic shock absorber, the damping force in the low-speed region of the piston speed is dependent on a flow path area of the orifice, and the damping force in the high-speed region of the piston speed is dependent on a predetermined valve-opening pressure of the disk valve. Therefore, it is difficult to set damping force characteristics with a high degree of freedom.

The above-mentioned related art is disclosed in, for example, Japanese Patent Application Public Disclosure No. HEI 3-113139. The hydraulic shock absorber disclosed in this document comprises a back-pressure chamber and a relief valve which are formed on a rear side of the disk valve. When a pressure in the back-pressure chamber reaches a predetermined level, the pressure is relieved through the relief valve. With this arrangement, part of the hydraulic fluid is introduced through an inlet fluid passage into the back-pressure chamber, and is released through a downstream-side orifice into a downstream-side chamber. Thus, by applying the back pressure in the back-pressure chamber to the disk valve in a valve-closing direction and controlling this back pressure in the back-pressure chamber, a degree of freedom for setting damping force characteristics is increased.

In the above-mentioned related art of a hydraulic shock absorber comprising a back-pressure chamber, to effectively apply the back pressure to the disk valve, it is considered to increase an area of the back-pressure chamber (this structure is not known). With this structure, an outer diameter of the back-pressure chamber becomes larger than a diameter of a valve seat portion for the disk valve. In this case, during a reverse stroke (an extension stroke for a compression-side disk valve, and a compression stroke for an extension-side disk valve), the disk valve receives, at an outer circumferential portion thereof corresponding to a difference between the outer diameter of the back-pressure chamber and the diameter of the seat portion, an increased pressure in an upstream-side chamber in a valve-opening direction.

Further, when the flow path area of the downstream-side orifice is set to be smaller than the flow path area of the inlet fluid passage, the pressure in the back-pressure chamber for the compression-side disk valve is not generated during the extension stroke of the piston rod, and the pressure in the back-pressure chamber for the extension-side disk valve is not generated during the compression stroke. In this case, under a force acting in a valve-opening direction based on the above-mentioned difference in diameter, the disk valve opens during the reverse stroke, so that damping force becomes unstable.

SUMMARY OF THE INVENTION

In view of the above situation, the present invention has been made. It is an object of the present invention to provide a hydraulic shock absorber which enables setting of damping force characteristics with a high degree of freedom, to thereby obtain appropriate damping force characteristics, and which enables generation of stable damping force.

The present invention provides a hydraulic shock absorber comprising:

a cylinder in which a hydraulic fluid is sealably contained;

a piston which is slidably fitted into the cylinder;

a piston rod having one end thereof connected to the piston, the other end of the piston rod extending to an outside of the cylinder;

a main valve for controlling a flow of the hydraulic fluid from an upstream-side chamber to a downstream-side chamber generated according to a sliding movement of the piston, to thereby generate a damping force;

a back-pressure chamber for applying a back pressure in a direction for closing the main valve and controlling opening of the main valve by means of the back pressure in the back-pressure chamber;

a back-pressure chamber inlet fluid passage for introducing the hydraulic fluid from the upstream-side chamber into the back-pressure chamber;

a downstream-side orifice for allowing communication between the back-pressure chamber and the downstream-side chamber; and a check valve for allowing only a flow of the hydraulic fluid from the downstream-side chamber to the back-pressure chamber.

The check valve, when it opens, may increase a flow path area for the hydraulic fluid flowing into the back-pressure chamber to be greater than a flow path area of the back-pressure inlet fluid passage.

The hydraulic shock absorber may further comprise a relief valve for releasing the back pressure in the back-pressure chamber into the downstream-side chamber. The check valve may be provided in the relief valve.

The relief valve may comprise a disk valve formed by a plurality of disks in a stacked configuration.

The check valve may comprise a flow passage formed by cut portions or openings formed in the plurality of disks and a valve body stacked on the disks, the valve body being adapted to open and close the flow passage.

An elastic seal member defining the back-pressure chamber may be fixed to an outer circumferential portion of a rear surface of the main valve, so as to be integral with the main valve.

The present invention also provides a hydraulic shock absorber comprising:

a cylinder in which a hydraulic fluid is sealably contained;

a piston which is fitted into the cylinder and which divides an inside of the cylinder into two chambers;

a fluid passage which allows a flow of the hydraulic fluid from one of the two chambers to the other chamber generated according to a sliding motion of the piston that pressurizes said one chamber;

a main valve which controls the flow of the hydraulic fluid generated in the fluid passage, to thereby generate a damping force;

a back-pressure chamber for applying a back pressure in a direction for closing the main valve; and a check valve which prevents a flow of the hydraulic fluid from the back-pressure chamber to said other chamber when the piston pressurizes said one chamber, and which allows a pressure in said other chamber to be introduced into the back-pressure chamber when the piston pressurizes said other chamber.

DETAILED DESCRIPTION OF THE PREFERRED EMBODIMENTS

Figure 1:
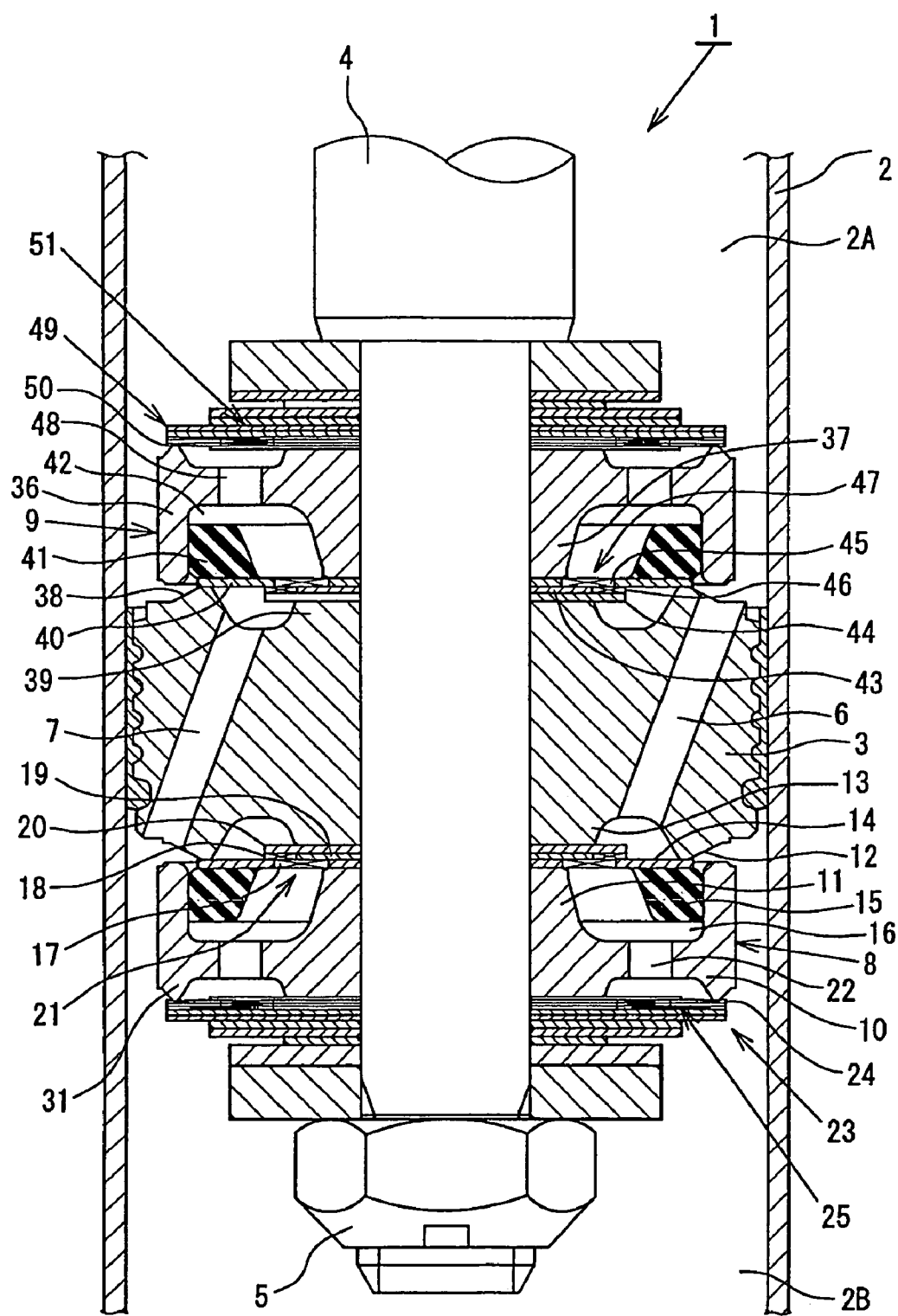
FIG. 1 is a vertical cross-sectional view of an essential part of a hydraulic shock absorber according to an embodiment of the present invention.

Hereinbelow, an embodiment of the present invention is described in detail, referring to the drawings.

Figure 2:
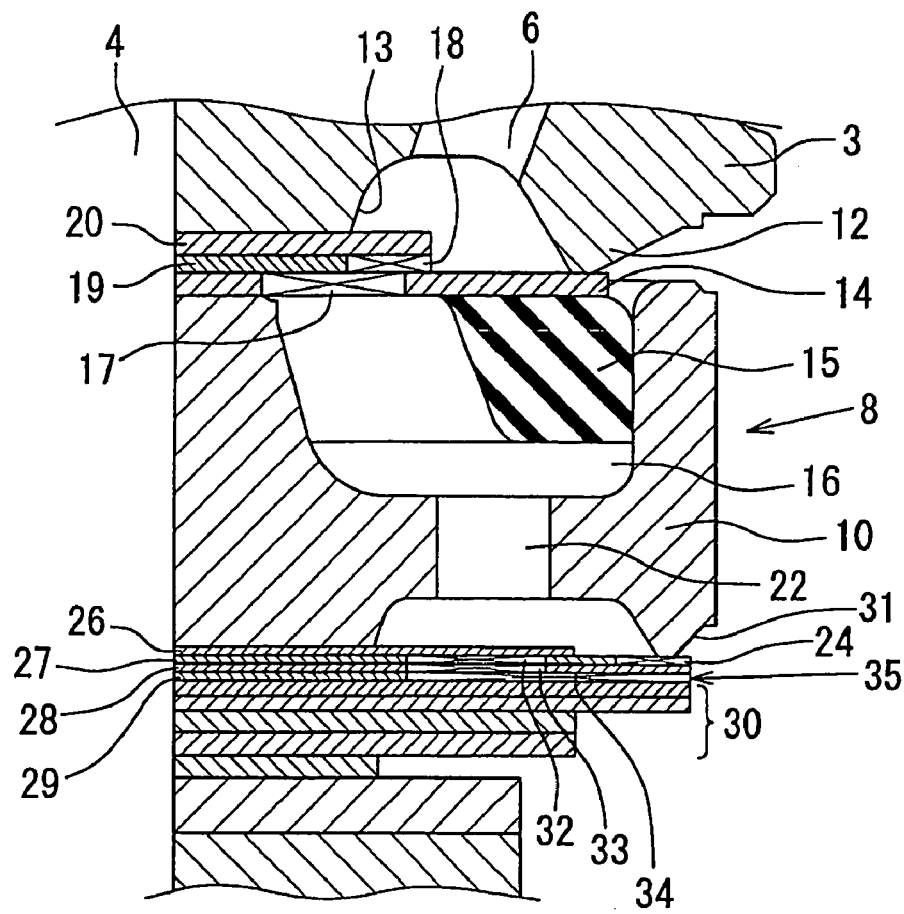
FIG. 2 is an enlarged view of an extension-side damping force generating mechanism in the hydraulic shock absorber of FIG. 1.
Figure 3:
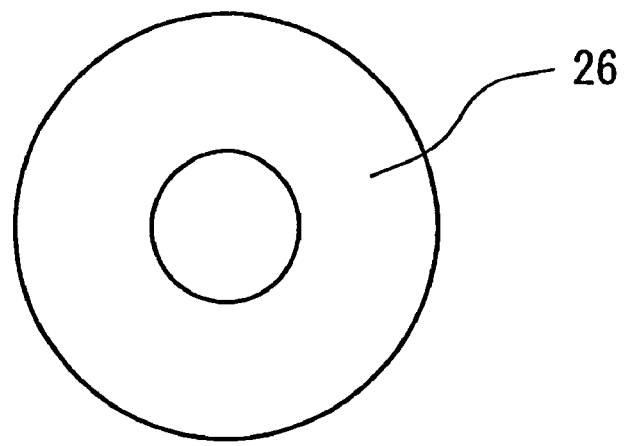
FIG. 3 is a front view of a disk forming a check valve in the hydraulic shock absorber of FIG. 1.
Figure 4:
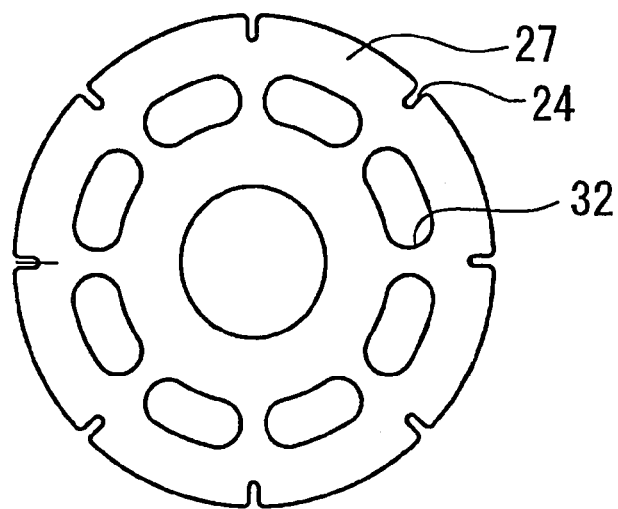
FIG. 4 is a front view of a disk including a plurality of openings which form the check valve in the hydraulic shock absorber of FIG. 1.
Figure 5:
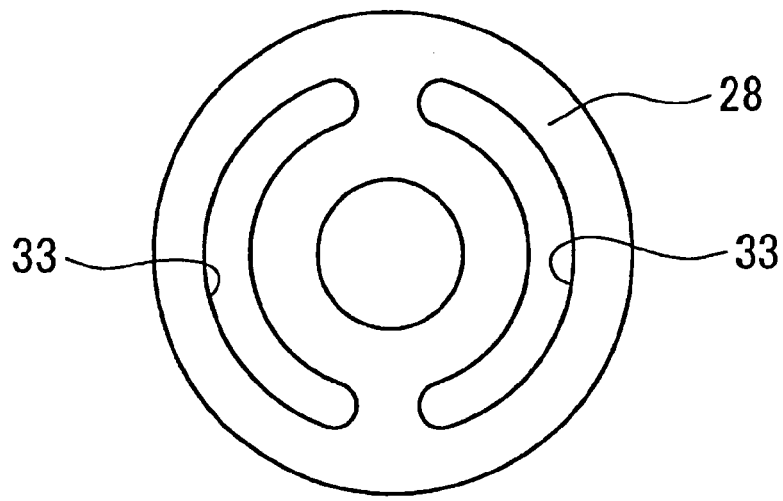
FIG. 5 is a front view of a disk including a pair of arcuate openings which form the check valve in the hydraulic shock absorber of FIG. 1.
Figure 6:
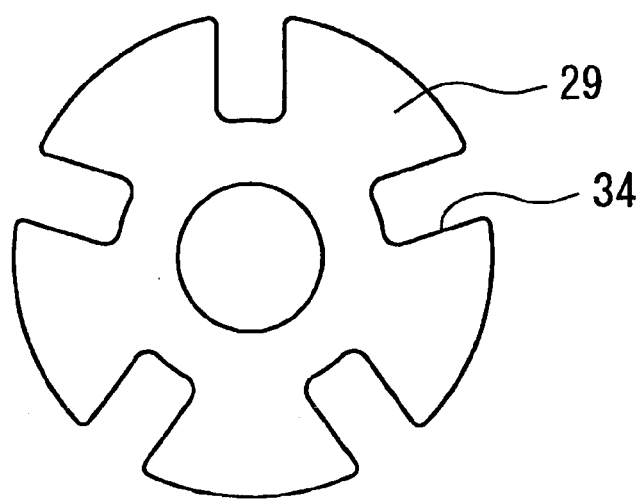
FIG. 6 is a front view of a disk including radial cut portions which form the check valve in the hydraulic shock absorber of FIG. 1.

As indicated in FIGS. 1 and 2, a hydraulic shock absorber 1 according to this embodiment is a cylinder type hydraulic shock absorber adapted to be mounted on a suspension apparatus for a vehicle, such as an automobile. The hydraulic shock absorber 1 comprises a cylinder 2 (only a part of a side wall thereof is shown) in which a hydraulic fluid is sealably contained, and a piston 3 which is slidably fitted into the cylinder 2. By means of the piston 3, an inside of the cylinder 2 is divided into two chambers; namely, an upper cylinder chamber 2A and a lower cylinder chamber 2B. One end of a piston rod 4 is connected to the piston 3 by means of a nut 5. The other end of the piston rod 4 is inserted through a rod guide (not shown) and an oil seal (not shown) attached to an upper end portion of the cylinder 2, so as to extend to an outside of the cylinder. The lower cylinder chamber 2B is connected to a reservoir (not shown) through a base valve (not shown) having appropriate flow resistance. The hydraulic fluid and a gas are sealably contained in the reservoir.

The piston 3 includes an extension-side fluid passage 6 and a compression-side fluid passage 7 for communication between the upper cylinder chamber 2A and the lower cylinder chamber 2B. The piston 3 is provided at an end portion thereof on a side of the lower cylinder chamber 2B with an extension-side damping force generating mechanism 8. The extension-side damping force generating mechanism 8 is adapted to control a flow of the hydraulic fluid in the extension-side fluid passage 6, to thereby generate a damping force. Further, the piston 3 is provided at an end portion thereof on a side of the upper cylinder chamber 2A with a compression-side damping force generating mechanism 9. The compression-side damping force generating mechanism 9 is adapted to control a flow of the hydraulic fluid in the compression-side fluid passage 7, to thereby generate a damping force.

Description is made below with regard to the extension-side damping force generating mechanism 8.

The extension-side damping force generating mechanism 8 comprises a substantially cylindrical valve member 10 having one end closed. The valve member 10 is connected to the end portion of the piston 3 on a side of the lower cylinder chamber 2B. The valve member 10 includes a cylindrical portion 11 which vertically extends from an inner side of the closed end portion of the valve member 10. The piston rod 4 extends through the cylindrical portion 11. The valve member 10 is fixed to the piston 3 and the piston rod 4 by threadably engaging the nut 5 with a lower end (as viewed in FIG. 1) of the piston rod 4. The piston 3 includes an annular seat portion 12 and an annular clamp portion 13, which are respectively formed at an outer circumferential portion and an inner circumferential portion of an end face of the piston 3 on a side of the lower cylinder chamber 2B. Both the annular seat portion 12 and the annular clamp portion 13 are formed as projections on a side of the lower cylinder chamber 2B. The extension-side fluid passage 6 opens into an annular space between the seat portion 12 and the clamp portion 13. An inner circumferential portion of a flexible main disk valve 14 (a main valve) is clamped between the cylindrical portion 11 and the clamp portion 13, and an outer circumferential portion of the main disk valve 14 is seated on the seat portion 12. An annular elastic seal member 15 is fixed to an outer circumferential portion of a rear surface of the main disk valve 14. An outer circumferential surface of the elastic seal member 15 is slidably and gas-tightly abutted against an inner circumferential surface of the valve member 10, thus forming a back-pressure chamber 16 inside the valve member 10.

An outer diameter of the back-pressure chamber 16 (a diameter of the inner circumferential surface of the valve member 10, which surface abuts against the outer circumferential surface of the elastic seal member 15) is larger than a diameter of the annular seat portion 12 formed at the outer circumferential portion of the end face of the piston. Therefore, during a reverse stroke (a compression stroke in this case), when the pressure in the lower cylinder chamber 2B becomes high, the main disk valve 14 receives a fluid force in a valve-opening direction at an outer circumferential portion thereof corresponding to a difference between the outer diameter of the back-pressure chamber 16 and the diameter of the seat portion 12. When the main disk valve 14 opens during a reverse stroke due to the force acting in the valve-opening direction based on the difference in diameter, damping force becomes unstable. Therefore, during a reverse stroke of the piston rod 4, a check valve 25 described later is opened, to thereby introduce a pressure in the downstream-side chamber into the back-pressure chamber 16, thus increasing the back pressure in the back-pressure chamber 16. By this arrangement, the main disk valve 14 can be reliably maintained in a closed position, so that a stable damping force can be generated.

A cut-away disk member 19 and a disk member 20 are held between the main disk valve 14 and the piston 3. An opening 17 is formed at an inner circumferential portion of the main disk valve 14. The cut-away disk member 19 having a plurality of cut portions 18 (an upstream-side orifice) and the disk member 20 are provided in a stacked configuration at a position facing the opening 17. The opening 17 and the cut portions 18 form a back-pressure chamber inlet fluid passage 21, which always allows communication between the extension-side fluid passage 6 and the back-pressure chamber 16. The main disk valve 14, when deflected and separated from the seat portion 12, is separated from the cut-away disk member 19, to thereby increase a flow path area of the back-pressure chamber inlet fluid passage 21.

A fluid passage 22 is formed in the closed end portion of the valve member 10, so as to allow communication between the back-pressure chamber 16 and the lower cylinder chamber 2B. The fluid passage 22 is provided with a relief valve 23 (a disk valve), which is normally closed and serves to release the hydraulic fluid in the back-pressure chamber 16 into the lower cylinder chamber 2B when the pressure in the back-pressure chamber 16 reaches a predetermined level. The relief valve 23 includes a downstream-side orifice 24 (a cut portion) which always allows communication between the back-pressure chamber 16 and the lower cylinder chamber 2B. The relief valve 23 also includes the check valve 25 which allows only a flow of the hydraulic fluid from the lower cylinder chamber 2B to the back-pressure chamber 16.

Next, referring to FIGS. 2 to 6, description is made below with regard to structures of the relief valve 23 and the check valve 25.

The relief valve 23 is formed by providing disks 26, 27, 28 and 29 shown in FIGS. 3 to 6 and another disk 30 (see FIG. 2) in a stacked configuration and clamping inner circumferential portions of these disks by means of the nut 5 so that an outer circumferential portion of the disks is seated on a seat portion 31 formed at the closed end portion of the valve member 10. When the back pressure in the back-pressure chamber 16 reaches a predetermined level, the relief valve 23 opens by being deflected and separated from the seat portion 31.

An outer circumferential portion of the disk 27 seated on the seat portion 31 includes a plurality of cut portions forming the downstream-side orifice 24 (these cut portions are indicated by the same reference numeral 24 as used for the downstream-side orifice). The disk 27 also includes a plurality of arcuate openings 32 arranged in a circumferential direction of the disk 27. The disk 28 adjacent to the disk 27 includes a pair of arcuate openings 33 which communicate with the openings 32. The disk 29 adjacent to the disk 28 includes a plurality of cut portions 34 extending radially from a position facing the openings 33 of the disk 28 to an outer circumferential edge of the disk 29. The openings 32 and 33 and the cut portions 34 form a fluid passage 35 which allows communication between the back-pressure chamber 16 and the lower cylinder chamber 2B.

The disk 26 (a valve body) is disposed adjacent to the disk 27 on a side of the back-pressure chamber 16. The disk 26 forms the check valve 25. The disk 26 covers the openings 32 of the disk 27. Therefore, the disk 26 prevents a flow of the hydraulic fluid from the back-pressure chamber 16 through the fluid passage 35 to the lower cylinder chamber 2B. With respect to a flow of the hydraulic fluid from the lower cylinder chamber 2B through the fluid passage 35 to the back-pressure chamber 16, the disk 26 is deflected and separated from the disk 27, to thereby permit the flow of the hydraulic fluid.

Next, explanation is made with regard to a relationship between the flow path areas of the back-pressure chamber inlet fluid passage 21, the downstream-side orifice 24 and the check valve 25.

The flow path area of the back-pressure chamber inlet fluid passage 21 is larger than that of the downstream-side orifice 24, even before the main disk valve 14 opens. Therefore, when a flow of the hydraulic fluid from the back-pressure chamber inlet fluid passage 21 to the downstream-side orifice 24 is generated, the back-pressure chamber 16 is pressurized due to a difference in flow path area between the back-pressure chamber inlet fluid passage 21 and the downstream-side orifice 24.

On the other hand, during a reverse stroke (a compression stroke in this case), when the lower cylinder chamber 2B is pressurized, the check valve 25 opens. A total of the flow path area of the check valve 25 and the flow path area of the downstream-side orifice 24 is set to be larger than the flow path area of the back-pressure chamber inlet fluid passage 21. Therefore, the back pressure in the back-pressure chamber 16 is increased, with the result that a fluid force acting in a direction for closing the main disk valve 14 due to the pressure in the back-pressure chamber 16 becomes larger than the fluid force acting in a direction for opening the main disk valve 14 due to the pressure in the lower cylinder chamber 2B. Thus, during a reverse stroke (a compression stroke in this case), when the fluid force acts in a valve-opening direction on the outer circumferential portion of the main disk valve 14 corresponding to a difference between the outer diameter of the back-pressure chamber 16 and the diameter of the seat portion 12, the main disk valve 14 can be reliably maintained at a closed position by increasing the back pressure in the back-pressure chamber 16.

Description is made below with regard to the compression-side damping force generating mechanism 9.

The compression-side damping force generating mechanism 9 is arranged in the same manner as the extension-side damping force generating mechanism 8. A valve member 36 is arranged such that the piston rod 4 extends through a cylindrical portion 37 thereof, and the valve member 36 is fixed to the piston 3 and the piston rod 4 by threadably engaging the nut 5 with the lower end of the piston rod 4.

The piston 3 includes an annular seat portion 38 and a clamp portion 39. The annular seat portion 38 is formed at an outer circumferential portion of an end face of the piston 3 on a side of the upper cylinder chamber 2A, and projects towards the upper cylinder chamber 2A. The compression-side fluid passage 7 opens into an annular space between the annular seat portion 38, which projects from the outer circumferential portion of the end face of the piston 3, and the clamp portion 39. An inner circumferential portion of a main disk valve 40 (a main valve) is clamped between the cylindrical portion 37 and the clamp portion 39, and an outer circumferential portion of the main disk valve 40 is seated on the seat portion 38. An elastic seal member 41 fixed to the main disk valve 40 is slidably and gas-tightly abutted against an inner circumferential surface of the valve member 36, thus forming a back-pressure chamber 42 inside the valve member 36. An outer diameter of the back-pressure chamber 42 (a diameter of the inner circumferential surface of the valve member 36, which surface abuts against the outer circumferential surface of the elastic seal member 41) is larger than a diameter of the annular seat portion 38 formed at the outer circumferential portion of the end face of the piston. Therefore, during a reverse stroke (an extension stroke in this case), when the pressure in the upper cylinder chamber 2A becomes high, the main disk valve 40 receives a fluid force in a valve-opening direction at an outer circumferential portion thereof corresponding to a difference between the outer diameter of the back-pressure chamber 42 and the diameter of the seat portion 38. During a reverse stroke (an extension stroke in this case), a check valve 51 described later is opened, to thereby increase the back pressure in the back-pressure chamber 42. By this arrangement, the main disk valve 40 can be reliably maintained in a closed position, so that a stable damping force can be generated.

A cut-away disk member 43 and a disk member 44 are stacked on the main disk valve 40. An opening 45 of the main disk valve 40 and a plurality of cut portions 46 (an upstream-side orifice) of the cut-away disk member 43 form a back-pressure chamber inlet fluid passage 47, which always allows communication between the compression-side fluid passage 7 and the back-pressure chamber 42. The main disk valve 40 is separated from the cut-away disk member 43 at the same time the main disk valve 40 is separated from the seat portion 38, to thereby increase a flow path area of the back-pressure chamber inlet fluid passage 47.

A fluid passage 48 is formed in the closed end portion of the valve member 36, so as to allow communication between the back-pressure chamber 42 and the upper cylinder chamber 2A. The fluid passage 48 is provided with a relief valve 49 (a disk valve), which is normally closed and serves to release the hydraulic fluid in the back-pressure chamber 42 into the upper cylinder chamber 2A when the pressure in the back-pressure chamber 42 reaches a predetermined level. The relief valve 49 includes a downstream-side orifice 50 (a cut portion) which always allows communication between the back-pressure chamber 42 and the upper cylinder chamber 2A. The relief valve 49 also includes the check valve 51 which allows only a flow of the hydraulic fluid from the upper cylinder chamber 2A to the back-pressure chamber 42. Structures of the relief valve 49 and the check valve 51 are the same as those of the relief valve 23 and the check valve 25 in the extension-side damping force generating mechanism 8. Therefore, detailed explanation of the structures of the relief valve 49 and the check valve 51 is omitted.

A relationship between the flow path areas of the back-pressure chamber inlet fluid passage 47, the downstream-side orifice 50 and the check valve 51 is the same as that in the extension-side damping force generating mechanism 8. That is, the flow path area of the back-pressure chamber inlet fluid passage 47 is larger than that of the downstream-side orifice 50. When a flow of the hydraulic fluid from the back-pressure chamber inlet fluid passage 47 to the downstream-side orifice 50 is generated, the back-pressure chamber 42 is pressurized due to a difference in flow path area between the back-pressure chamber inlet fluid passage 47 and the downstream-side orifice 50. During a reverse stroke (an extension stroke in this case), when the upper cylinder chamber 2A is pressurized, the check valve 51 opens. A total of the flow path area of the check valve 51 and the flow path area of the downstream-side orifice 50 is set to be larger than the flow path area of the back-pressure chamber inlet fluid passage 47. Therefore, the back pressure in the back-pressure chamber 42 is increased. Therefore, during a reverse stroke (an extension stroke in this case), a fluid force acting in a direction for closing the main disk valve 40 due to the pressure in the back-pressure chamber 42 becomes larger than the fluid force acting in a direction for opening the main disk valve 40 due to the pressure in the upper cylinder chamber 2A.

Next, an operation of the above-mentioned embodiment is described.

During an extension stroke of the piston rod 4, the hydraulic fluid in the upper cylinder chamber 2A (an upstream-side chamber) flows, according to a sliding motion of the piston 3 in the cylinder 2, through the extension-side fluid passage 6 in the piston 3 and the extension-side damping force generating mechanism 8 into the lower cylinder chamber 2B (a downstream-side chamber), and a damping force is generated by means of the extension-side damping force generating mechanism 8. In this instance, the hydraulic fluid in an amount corresponding to the volume of a portion of the piston rod 4 that has exited the cylinder 2 flows from the reservoir into the lower cylinder chamber 2B through the base valve. In the reservoir, the gas expands, thus compensating for a volume change in the cylinder 2.

In the extension-side damping force generating mechanism 8, in an extremely low speed region of the piston speed (an initial part of the stroke of the piston rod 4), a damping force having orifice characteristics is generated due to the back-pressure chamber inlet fluid passage 21 and the downstream-side orifice 24.

According to an increase of the piston speed, the main disk valve 14 opens, and a damping force having valve characteristics is generated. When the main disk valve 14 opens, the hydraulic fluid flows directly to the lower cylinder chamber 2B through a space formed between the seat portion 12 and the main disk valve 14, while flowing to the lower cylinder chamber 2B through the back-pressure chamber inlet fluid passage 21, the back-pressure chamber 16 and the downstream-side orifice 24. However, simultaneously with the opening of the main disk valve 14, the flow path area of the back-pressure chamber inlet fluid passage 21 increases, thus increasing an amount of the hydraulic fluid flowing into the back-pressure chamber 16 and increasing the back pressure in the back-pressure chamber 16. Consequently, as the piston speed increases, a valve-opening pressure of the main disk valve 14 increases, to thereby increase a damping force. When the pressure in the back-pressure chamber 16 reaches a predetermined level, the relief valve 23 opens, to thereby release the pressure in the back-pressure chamber 16 to the lower cylinder chamber 2B. Therefore, an excessive increase in the valve-opening pressure of the main disk valve 14, that is, an extension-side damping force, can be prevented.

During a compression stroke of the piston rod 4, the hydraulic fluid in the lower cylinder chamber 2B (an upstream-side chamber) flows, according to a sliding motion of the piston 3 in the cylinder 2, through the compression-side fluid passage 7 in the piston 3 and the compression-side damping force generating mechanism 9 into the upper cylinder chamber 2A (a downstream-side chamber), and a damping force is generated by means of the compression-side damping force generating mechanism 9. In this instance, the hydraulic fluid in an amount corresponding to the volume of a portion of the piston rod 4 that has entered the cylinder 2 flows into the reservoir through the base valve, and compresses the gas in the reservoir. As a result, a volume change in the cylinder 2 is compensated for.

In the compression-side damping force generating mechanism 9, as in the case of the extension-side damping force generating mechanism 8, in an extremely low speed region of the piston speed (an initial part of the stroke of the piston rod 4), a damping force having orifice characteristics is generated due to the back-pressure chamber inlet fluid passage 47 and the downstream-side orifice 50.

According to an increase of the piston speed, the main disk valve 40 opens, and a damping force having valve characteristics is generated. When the main disk valve 40 opens, the hydraulic fluid flows directly to the upper cylinder chamber 2A through a space formed between the seat portion 38 and the main disk valve 40, while flowing to the upper cylinder chamber 2A through the back-pressure chamber inlet fluid passage 47, the back-pressure chamber 42 and the downstream-side orifice 50. However, simultaneously with the opening of the main disk valve 40, the flow path area of the back-pressure chamber inlet fluid passage 47 increases, thus increasing an amount of the hydraulic fluid flowing into the back-pressure chamber 42 and increasing the back pressure in the back-pressure chamber 42. Consequently, as the piston speed increases, a valve-opening pressure of the main disk valve 40 increases, to thereby increase a damping force. When the pressure in the back-pressure chamber 42 reaches a predetermined level, the relief valve 49 opens, to thereby release the pressure in the back-pressure chamber 42 into the upper cylinder chamber 2A. Therefore, an excessive increase in the valve-opening pressure of the main disk valve 40, that is, a compression-side damping force, can be prevented.

Thus, the flow path areas of the back-pressure chamber inlet fluid passages 21 and 47 are increased by opening the main disk valves 14 and 40, to thereby control the pressures in the back-pressure chambers 16 and 42. With this arrangement, damping force characteristics can be set with a high degree of freedom, to thereby enable generation of an appropriate damping force. Further, the extension-side and compression-side damping force generating mechanisms 8 and 9 can be simplified in structure and reduced in size.

Next, an operation of the extension-side damping force generating mechanism 8 and the compression-side damping force generating mechanism 9 during a reverse stroke is explained.

During an extension stroke of the piston rod 4, in the compression-side damping force generating mechanism 9, the check valve 51 opens, to thereby introduce the pressure in the upper cylinder chamber 2A (the downstream-side chamber for the compression stroke) into the back-pressure chamber 42. As a result, a fluid force acting in a direction for closing the main disk valve 40 due to the pressure in the back-pressure chamber 42 becomes larger than a fluid force acting in a valve-opening direction due to the pressure in the upper cylinder chamber 2A. Therefore, the compression-side main disk valve 40 can be reliably maintained in a closed position, to thereby enable a stable damping force to be generated.

During a compression stroke of the piston rod 4, in the extension-side damping force generating mechanism 8, the check valve 25 opens, to thereby introduce the pressure in the lower cylinder chamber 2B (the downstream-side chamber for the extension stroke) into the back-pressure chamber 16. As a result, a fluid force acting in a direction for closing the main disk valve 14 due to the pressure in the back-pressure chamber 16 becomes larger than a fluid force acting in a valve-opening direction due to the pressure in the lower cylinder chamber 2B. Therefore, the extension-side main disk valve 14 can be reliably maintained in a closed position, to thereby enable a stable damping force to be generated.

As a result, it has become possible to increase the size of the back-pressure chamber inlet fluid passages 21 and 47 while reducing the size of the downstream-side orifices 24 and 50, and damping force characteristics can be set with a high degree of freedom.

Figure 7:
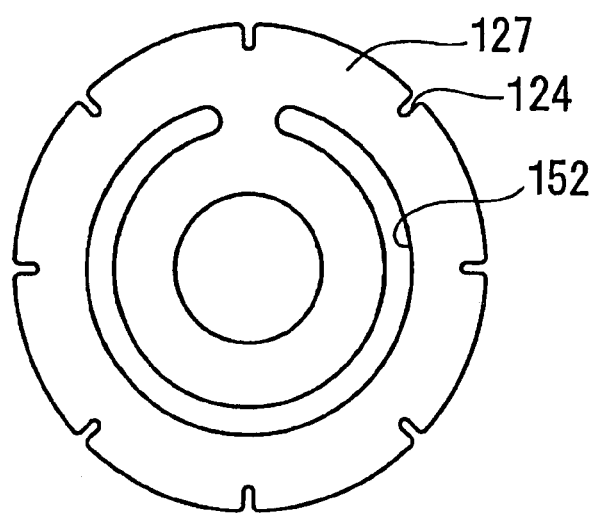
FIG. 7 is a front view of a disk including arcuate cut portions which form a modified example of the check valve in the hydraulic shock absorber of FIG. 1.
Figure 8:
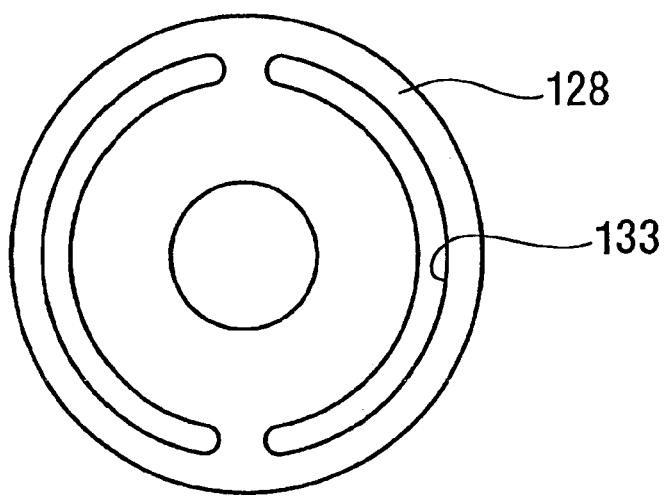
FIG. 8 is a front view of a disk including a pair of arcuate openings which form the modified example of the check valve in the hydraulic shock absorber of FIG. 1.
Figure 9:
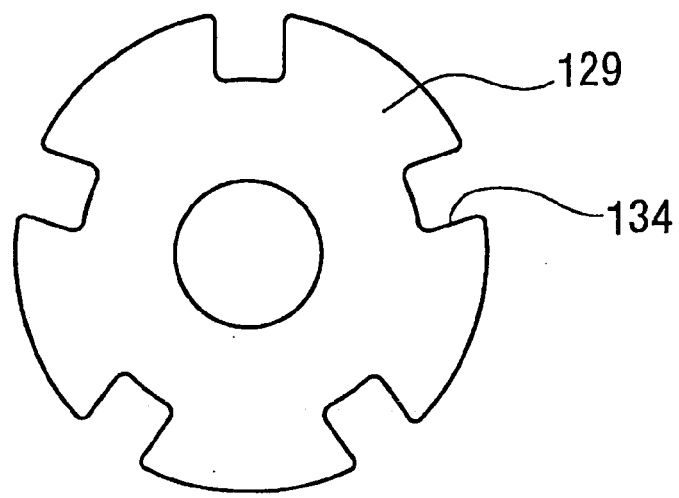
FIG. 9 is a front view of a disk including radial cut portions which form the modified example of the check valve in the hydraulic shock absorber of FIG. 1.

As a modified example of the above-mentioned embodiment, the check valve 25 or 51 may be arranged by omitting the disk 26 and providing, in a stacked configuration, a disk 127 such as that shown in FIG. 7 including an arcuate cut portion 152 formed therein, instead of the openings 32, a disk 128 such as that shown in FIG. 8 including openings 133 formed at positions facing an outer circumferential portion of the disk 127 outside the cut portion 152 (the cut portion 152 and the openings 133 are not in communication with each other when the disks 127 and 128 are stacked on one another), and a disk 129 such as that shown in FIG. 9 including cut portions 134 for communication with the openings 133. In this case, the check valve 25 or 51 is opened and closed by deflecting the outer circumferential portion of the disk 127 outside the cut portion 152 (a valve body integral with the disk 127).

In the above embodiment, the flow path areas of the back-pressure chamber inlet fluid passages 21 and 47 are increased according to the opening of the main disk valves 14 and 40. However, this does not limit the present invention. The flow path area may be varied by using a shutter or the like, as is disclosed in Japanese Patent Application Public Disclosure No. HEI 3-113139, or may be fixed as in a fixed orifice. The entire disclosure of Japanese Patent Application Public Disclosure No. HEI 3-113139 is incorporated herein by reference in its entirety.

Further, in the above embodiment, the damping force generating mechanism 8 comprising the back-pressure chamber 16 and the damping force generating mechanism 9 comprising the back-pressure chamber 42 are provided for an extension stroke and a compression stroke, respectively. However, a damping force generating mechanism may be provided for either one of an extension stroke and a compression stroke. Although the damping force generating mechanisms 8 and 9 are formed in the piston 3 in the above embodiment, the damping force generating mechanisms 8 and 9 may be provided outside the cylinder 2. In this case, a flow of the hydraulic fluid generated according to a sliding motion of the piston 3 is introduced through a passage into the damping force generating mechanisms 8 and 9 outside the cylinder.

In the hydraulic shock absorber according to the above embodiment, a flow of the hydraulic fluid from an upstream-side chamber to a downstream-side chamber due to a stroke of the piston rod is controlled by the main valve, to thereby generate a damping force. By controlling the opening of the main valve using a back pressure in the back-pressure chamber, damping force characteristics can be set with a high degree of freedom. During a reverse stroke of the piston rod, the back pressure in the back-pressure chamber is increased by opening the check valve to introduce a pressure in the downstream-side chamber into the back-pressure chamber. This enables the main valve to be reliably maintained in a closed position, to thereby obtain a stable damping force.

Further, by means of the relief valve, an excessive increase in the pressure in the back-pressure chamber can be prevented. By means of the check valve provided in the relief valve, the pressure in the downstream-side chamber can be introduced into the back-pressure chamber.

Further, the relief valve and the check valve can be formed as an integral unit, thus achieving simplification in structure and a reduction in size.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2004-168508 filed on Jun. 7, 2004 including specification, claims, drawings and summary is incorporated herein by reference in its entirety.

What is claimed is:

1. A hydraulic shock absorber comprising:
a cylinder in which a hydraulic fluid is sealably contained;
a piston which is slidably fitted into the cylinder;
a piston rod having one end thereof connected to the piston, the other end of the piston rod extending to an outside of the cylinder;
a main valve for controlling a flow of the hydraulic fluid from an upstream-side chamber to a downstream-side chamber generated according to a sliding movement of the piston, to thereby generate a damping force;
a back-pressure chamber for applying a back pressure in a direction for closing the main valve and controlling opening of the main valve by means of the back pressure in the back-pressure chamber;
a back-pressure chamber inlet fluid passage for introducing the hydraulic fluid from the upstream-side chamber into the back-pressure chamber;
a downstream-side orifice for allowing communication between the back-pressure chamber and the downstream-side chamber; and
a check valve for allowing only a flow of the hydraulic fluid from the downstream-side chamber to the back-pressure chamber.

2. A hydraulic shock absorber according to claim 1, wherein the check valve, when it opens, increases a flow path area for the hydraulic fluid flowing into the back-pressure chamber to be greater than a flow path area of the back-pressure inlet fluid passage.

3. A hydraulic shock absorber according to claim 2, further comprising a relief valve for releasing the back pressure in the back-pressure chamber into the downstream-side chamber, the check valve being provided in the relief valve.

4. A hydraulic shock absorber according to claim 3, wherein the relief valve comprises a disk valve formed by a plurality of disks in a stacked configuration, and the check valve comprises a flow passage formed in the plurality of disks and a valve body stacked on the disks, the valve body being adapted to open and close the flow passage.

5. A hydraulic shock absorber according to claim 4, wherein an elastic seal member defining the back-pressure chamber is fixed to an outer circumferential portion of a rear surface of the main valve, so as to be integral with the main valve.

6. A hydraulic shock absorber according to claim 1, further comprising a relief valve for releasing the back pressure in the back-pressure chamber into the downstream-side chamber, the check valve being provided in the relief valve.

7. A hydraulic shock absorber according to claim 6, wherein the relief valve comprises a disk valve formed by a plurality of disks in a stacked configuration, and the check valve comprises a flow passage formed in the plurality of disks and a valve body stacked on the disks, the valve body being adapted to open and close the flow passage.

8. A hydraulic shock absorber according to claim 7, wherein an elastic seal member defining the back-pressure chamber is fixed to an outer circumferential portion of a rear surface of the main valve, so as to be integral with the main valve.

9. A hydraulic shock absorber according to claim 6, wherein an elastic seal member defining the back-pressure chamber is fixed to an outer circumferential portion of a rear surface of the main valve, so as to be integral with the main valve.

10. A hydraulic shock absorber according to claim 1, wherein an elastic seal member defining the back-pressure chamber is fixed to an outer circumferential portion of a rear surface of the main valve, so as to be integral with the main valve.

11. A hydraulic shock absorber according to claim 2, wherein an elastic seal member defining the back-pressure chamber is fixed to an outer circumferential portion of a rear surface of the main valve, so as to be integral with the main valve.

12. A hydraulic shock absorber according to claim 3, wherein an elastic seal member defining the back-pressure chamber is fixed to an outer circumferential portion of a rear surface of the main valve, so as to be integral with the main valve.

13. A hydraulic shock absorber comprising:
a cylinder in which a hydraulic fluid is sealably contained;
a piston which is fitted into the cylinder and which divides an inside of the cylinder into two chambers;
a fluid passage which allows a flow of the hydraulic fluid from one of the two chambers to the other chamber generated according to a sliding motion of the piston that pressurizes said one chamber;
a main valve which controls the flow of the hydraulic fluid generated in the fluid passage, to thereby generate a damping force;
a back-pressure chamber for applying a back pressure in a direction for closing the main valve; and
a check valve which prevents a flow of the hydraulic fluid from the back-pressure chamber to said other chamber when the piston pressurizes said one chamber, and which allows a pressure in said other chamber to be introduced into the back-pressure chamber when the piston pressurizes said other chamber.

* * * * *